(12) United States Patent
Anjanappa et al.

(10) Patent No.: US 7,237,986 B2
(45) Date of Patent: Jul. 3, 2007

(54) HIGH SPEED METAL DRILL BIT

(75) Inventors: Muniswamappa Anjanappa, Columbia, MD (US); Li Xu, Woodstock, MD (US); Stephen R. Crosby, Broad Brook, CT (US); Gerald Rescigno, Marriottsville, MD (US); Russell M Timmons, Lutherville, MD (US); Rickey J Thomas, Lineboro, MD (US)

(73) Assignees: Black & Decker Inc., Newark, DE (US); University of Maryland, Baltimore, MD (US)

( * ) Notice: Subject to any disclaimer, the term of this patent is extended or adjusted under 35 U.S.C. 154(b) by 195 days.

(21) Appl. No.: 10/914,111

(22) Filed: Aug. 9, 2004

(65) Prior Publication Data

US 2006/0029477 A1    Feb. 9, 2006

(51) Int. Cl.
*B23B 51/02* (2006.01)

(52) U.S. Cl. ...................................... 408/230; 408/227

(58) Field of Classification Search .................. 408/57, 408/59, 227, 229, 230; B23B 51/02
See application file for complete search history.

(56) References Cited

U.S. PATENT DOCUMENTS

| | | | | |
|---|---|---|---|---|
| 451,896 A | * | 5/1891 | Merritt | 408/230 |
| 2,322,894 A | * | 6/1943 | Stevens | 408/230 |
| 2,778,252 A | | 1/1957 | Oxford, Jr. | |
| 2,966,081 A | * | 12/1960 | Kallio | 408/230 |
| 3,199,381 A | * | 8/1965 | Mackey | 408/226 |
| 3,387,511 A | * | 6/1968 | Ackart, Sr. et al. | 408/230 |
| 3,592,555 A | | 7/1971 | Mackey, Sr. | |
| 4,602,900 A | * | 7/1986 | Arpaio, Jr. et al. | 408/230 |
| 4,605,347 A | | 8/1986 | Jodock et al. | |
| 4,898,503 A | * | 2/1990 | Barish | 408/230 |
| 4,968,193 A | | 11/1990 | Chaconas et al. | |
| 5,288,183 A | | 2/1994 | Chaconas et al. | |
| 5,423,640 A | * | 6/1995 | Lindblom et al. | 408/230 |
| 5,609,447 A | * | 3/1997 | Britzke et al. | 408/230 |
| 6,071,046 A | | 6/2000 | Hecht et al. | |
| 6,113,321 A | | 9/2000 | Mulroy et al. | |
| 6,132,149 A | * | 10/2000 | Howarth et al. | 408/230 |
| 6,443,674 B1 | | 9/2002 | Jaconi | |
| 6,585,460 B1 | * | 7/2003 | Meece et al. | 408/230 |

FOREIGN PATENT DOCUMENTS

| | | | |
|---|---|---|---|
| DE | 570667 | * | 2/1933 |
| EP | 0 088 037 | | 9/1983 |
| EP | 0 137 898 | | 4/1985 |
| GB | 1 270 347 | | 4/1972 |
| GB | 1 368 270 | | 9/1974 |
| GB | 2 193 913 | | 2/1988 |
| WO | WO 89/08520 | | 9/1989 |

* cited by examiner

*Primary Examiner*—Daniel W. Howell
(74) *Attorney, Agent, or Firm*—Harness, Dickey & Pierce, P.L.C.

(57) ABSTRACT

A metal cutting drill bit has a shank portion, a flute portion defining a helix angle and a tip. The tip has a primary cutting edge extending to an outer periphery of the drill bit. The primary cutting edge has a rake face defining a rake angle. The rake angle is different from the helix angle at the tip of the drill bit.

12 Claims, 5 Drawing Sheets

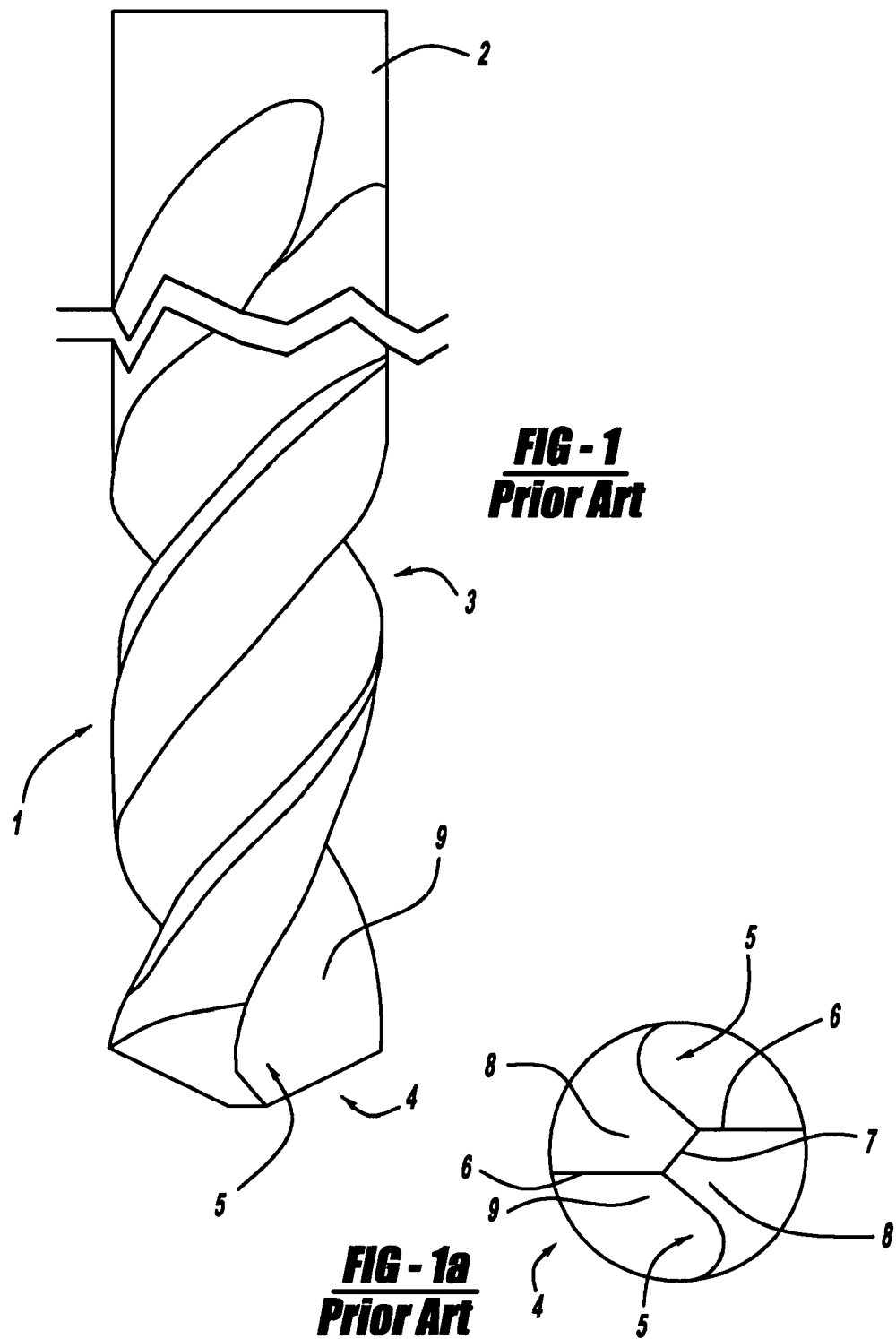

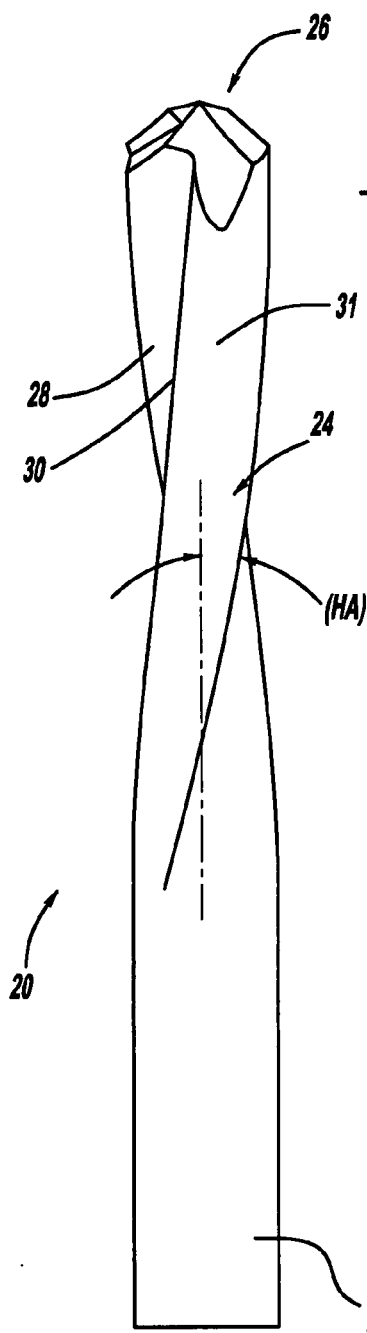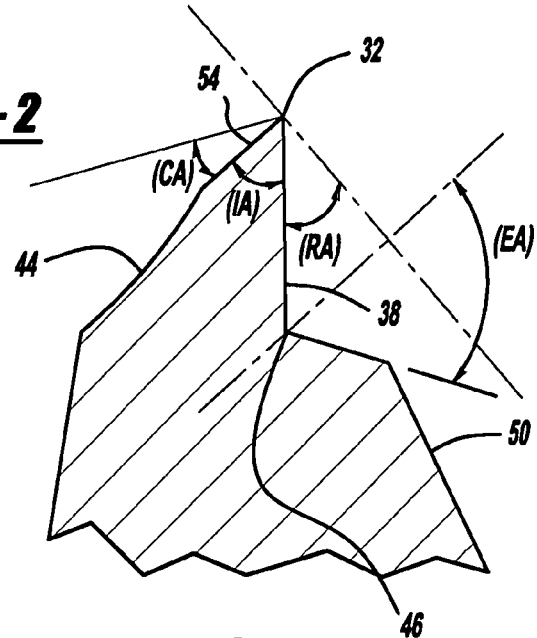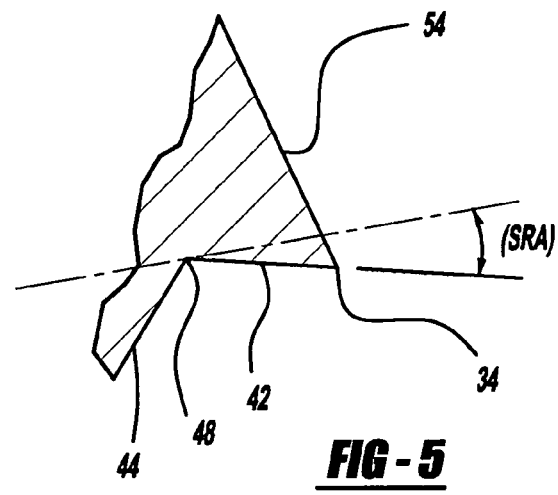

HIGH SPEED METAL DRILL BIT

FIELD OF THE INVENTION

The present invention relates to drill bits and, more particularly, to drill bits for drilling metallic material.

A typical prior art bit is illustrated in FIGS. 1 and 1a and designated with the reference numeral 1. Functionally, the drill bit 1 consists of three components; a drive transmission shank end 2; a middle fluted body 3; and the drill tip 4. The drive transmission shank 2 is a solid rod of circular or polygonal cross-section that fits into a chuck or similar-mechanism of a portable drill. This arrangement enables the transmission of rotational torque and axial thrust force required to create a hole.

The middle flute body 3 of the drill bit 1 has a double helix forming an outer helix around the solid core of the shaft. The outer helix provides a path to transport metal chips, generated by drilling, from the tip 4 of the drill bit 1 to the top plane of a hole. The flanks of the outer helix are tapered towards the shank to retain the chips during transportation while rotating the drill bit.

The drill tip 4 has several cutting edges 5 that are symmetric about the tip 4 on the drill bit 1. The cutting edges 5 are the most critical part of the drill bit 1 since they make contact with the metal at all time. The tip 4 has a geometry as shown in FIG. 1a. Each side of the tip has a primary cutting edge 6 and a chisel 7. The, primary cutting edge 6 on both sides, is a sharp edge defined by the intersection of a tapered clearance face 8 and a rake face 9. These edges 6 and 7 transmit the thrust force applied by the user and rotational torque to the target material. The chisel head 7 typically comes in two forms. In one case, the chisel 7 is formed as a result of grinding the rake and clearance face of the drill bit, which forms a negative rake angle. Another type of chisel, called a split point, requires an additional grinding operation that changes the rake angle of the chisel edge 7 from negative to zero, or to a positive rake angle.

Proper selection of the rake angle, clearance angle and point angles are critical for efficient drilling. The helix angle and the cross-section area of the flute determine the output of the outer helix and hence must be selected for a specific application. Further, the process parameters, such as speed, bias load, and environmental condition affect the drilling performance. Finally, the drilling performance depends on whether a portable, hand-held drill, is used or a rigid floor mounted drilling machine is used to make the hole.

Performance of a typical drill bit can be considered as the time taken to drill a hole of specific size and depth in a given material utilizing a pre-set energy output. In other words, "rate of drilling" can be considered as a performance indicator. Hence, for a fixed input energy, an improved drill-bit is a bit which can drill a similar hole faster without adversely affecting the tool life.

Although conventional drill bits have good strength, they are not as productive and as energy efficient. For example, the present drill bits are constrained in using the helix angle and rake angle of the primary cutting edge. Since the fluted surface blends smoothly with the primary cutting edge of the drill tip, the helix angle is the same as the rake angle of the cutting edge at the radially outermost edge. Consequently, the helix angle and rake angles are sub optimal if considered independently. Furthermore, these drill bits have rake angles that vary along the primary cutting edge. The variation of rake angle along the primary cutting edge causes the angle at the innermost point of the primary cutting edge to be less aggressive than the rake angle at the outermost point of the primary cutting edge. Thus, it is desirable to have a drill bit with a geometry that provides freedom to choose the helix angle and rake angles along the primary cutting edge independent of each other. Further, current drill bits consume excessive energy. For example, friction between the tool and the long chips is not minimized. Accordingly, a reduced friction and smooth transportation of the chips up the hole is a desired feature of the drill bit. The present invention provides the art with a drill bit having a geometry to achieve optimal drilling performance.

SUMMARY OF THE INVENTION

The present invention provides the art with a drill bit capable of drilling a metallic material with an increased rate of drilling while minimizing energy consumption. The present invention provides a drill bit which maximizes the material removal into a cutting action while minimizing the energy consumption without any constraints from the helix angle. The present invention provides a suitable recess in the drill tip to maximize the flow of chips from the cutting edge to the outer helix of the shaft. The present invention provides an improved chip breaking which also improves removal efficiency. The present invention enables the rake face and the helix angles at their juncture to be independent of one another.

According to an object of the present invention, a metal cutting drill bit comprises a shank portion, a flute portion with the flute defining a helix angle, and a tip. The tip includes a primary cutting edge extending to an outer periphery of the drill bit. The primary cutting edge has a rake face which defines a rake angle. The rake angle is different from the helix angle at the outermost periphery of the drill bit. The rake angle is constant across the primary cutting edge. An egress surface is positioned between the rake surface and a flute at the tip of the drill bit. The tip has a secondary cutting edge. The rake surface has a desired length dependent upon the diameter of the drill bit. The egress face is on a desired angle to enhance chip removal from the tip. The drill bit has a pair of primary cutting edges as well as a pair of secondary cutting edges.

According to a second aspect of the present invention, a metal cutting drill bit comprises a shank, a flute and a tip. The tip has at least one primary cutting edge which is defined by a rake surface and a clearance surface. The rake surface extends from the cutting edge a desired length. An egress surface is continuous with the rake surface. The egress surface extends outwards from the rake surface and is continuous with a flute surface. The flute, surface and the rake surface extend substantially axially along the drill bit. The rake surface and the flute surface are defined by different angles.

From the following detailed description taken in conjunction with the accompanying drawings and claims, other objects and advantages of the present invention become apparent to those skilled in the art.

BRIEF DESCRIPTION OF THE DRAWINGS

FIG. 1 is an elevational view of a prior art metal cutting drill bit.

FIG. 1a is a plan view of the tip of the drill bit of FIG. 1.

FIG. 2 is a perspective view of a drill bit in accordance with the present invention.

FIG. 4 is a cross-section view of FIG. 3 along lines 4—4 thereof.

FIG. 5 is a cross-section view of FIG. 3 along lines 5—5 thereof.

DETAILED DESCRIPTION OF THE PREFERRED EMBODIMENTS

Figures 3, 6:
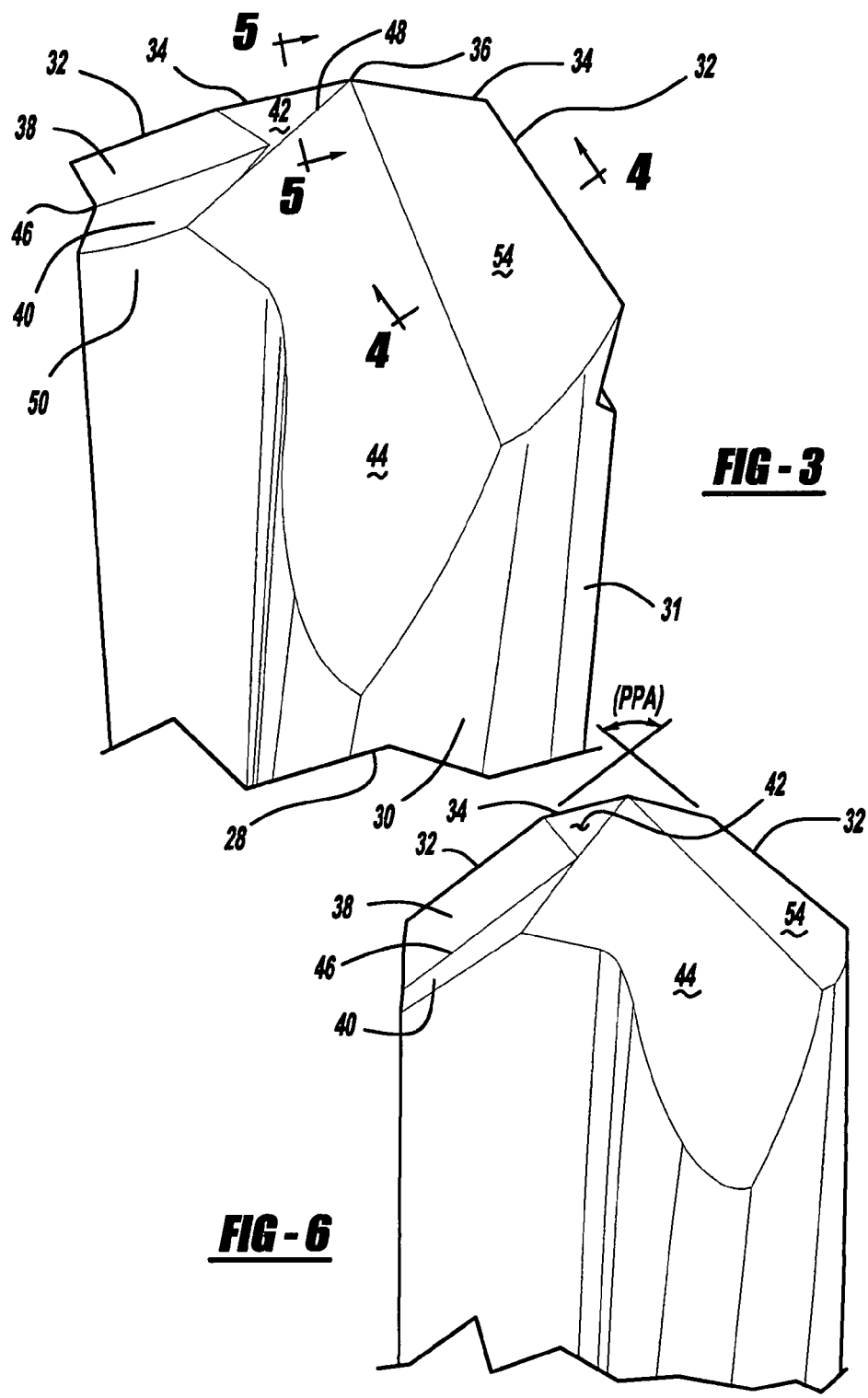
FIG. 3 is an enlarged perspective view of the drill bit tip of FIG. 2.
FIG. 6 is an elevational view of the tip of FIG. 3.

Turning to FIGS. 2 through 9a, a metal cutting drill bit in accordance with the invention is illustrated and designated with the reference numeral 20. The drill bit 20 includes a transmission portion 22 having a cylindrical or polygonal cross-section. A flute portion 24 is adjacent the transmission portion 22 and the flute portion 24 terminates at a tip 26. The flute portion 24 includes helical conveying grooves 28, as well as helical flutes 30. The helical flutes 30 have an outer surface 31 which defines the peripheral diameter of the drill bit 20.

The tip 26 includes a pair of primary cutting edges 32, a pair of secondary cutting edges 34 and a chisel tip 36. Each primary cutting edge 32 is defined by a primary rake face surface 38 and a primary clearance surface 54. The primary rake face is defined by a primary rake angle (RA) which can vary from 15° to 45°. Preferably, the rake angle (RA) is between 30° to 40° especially for a one-quarter inch diameter drill bit. The primary clearance face is defined by a primary clearance angle (CA) from 10° to 30°. A preferred range is from 15° to 25° especially for a quarter inch diameter drill bit. Accordingly, an included angle (IA) of the cutting edge is between 25° to 45°.

A primary point angle (PPA) is formed by the two primary cutting edges when the drill tip is viewed perpendicular to the drill bit axis, as seen in FIG. 6. The primary point angle (PPA) can vary between 90° to 150°. Preferably, the angle is 100° to 120° especially for a one-quarter inch diameter drill bit.

The rake angle of the primary cutting edge 32 is generally constant across the entire cutting edge 32. The rake face 38 has a desired length which is measured from the cutting edge to an intersecting edge 46. The length of the rake face 38 has been found to vary from 0.02" to 0.1". Preferably from 0.03" to 0.08" especially for a one-quarter inch drill bit. The rake face 38 terminates at the intersecting edge 46 which is continuous with an egress face 40.

The egress face 40 projects outward from the rake face 38 and is angled with respect to the axis of the drill bit. The egress face 40 provides a smooth transition for chips to travel from the primary rake face 38 into the flute conveying grooves 28. The egress face 40 is defined by an egress angle which is utilized to determine the geometry of the drill tip and its surrounding drill bit material in their region immediately after the rake angle ceases to exist. The egress angle (EA) is measured from the egress face 40 to a plane through the intersecting edge perpendicular to the axis of the drill bit. The egress angle (EA) varies between 10° to 70°. Preferably, the angle is 40° to 60° especially for a one-quarter inch diameter drill bit. The egress surface 40 enables the rake face angle to be different from the helix angle of the helical flutes.

Also, the egress angle enables the primary cutting edge angle to be constant along its length.

A secondary cutting edge 34 is formed by the intersection of the primary clearance face 54 and the secondary rake face 42. The secondary rake face 42 opens into the secondary clearance face 44. The rake angle (SRA) of the secondary rake face 42 varies from −30° to +15°. Preferably, the angle is +5° to +10° especially for a quarter inch drill bit.

Chips first travel up the secondary rake face 42 and enter the flute conveying grooves 28 via the secondary clearance face 44 of the opposite side. The secondary clearance face 44 of the opposite side provides the chips with a smooth transition between the secondary rake face 44 and the flute conveying groove 28. Also, an intersecting edge 48 between the secondary rake face 42 and the secondary clearance face 44 exist. This intersection can be a sharp corner, as illustrated in FIG. 5, or could be curved without affecting the performance.

Figure 7:
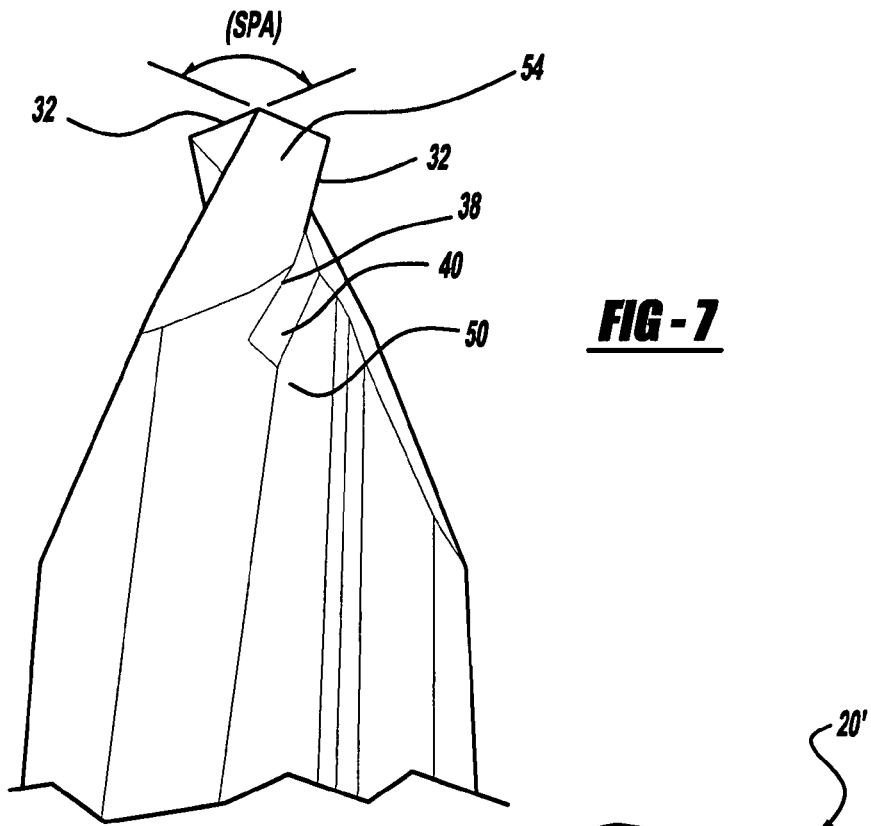
FIG. 7 is an elevational view of the tip of FIG. 3 rotated 90 degrees with respect to FIG. 6.

A secondary point angle is formed by the two secondary cutting edges 34. The secondary point angle is viewed perpendicular to the drill bit axis and is illustrated in FIG. 7. FIG. 7 is rotated 90° with respect to FIG. 6. The secondary point angle (SPA) can vary between 120° to 165°. Preferably, the angle is 135° to 155° especially for a one quarter inch drill bit.

The helix 30 has an outer surface 31 or margin which provides the necessary guiding surface for the drill bit. The surface 31 keeps the drill bit through the center of the hole. The surface 31, while opening the center of the bit, creates friction with respect to the surface. Accordingly, the width of the surface can vary from 0.005" to 0.1". Preferably, the range is 0.012" to 0.04" especially for a one quarter inch diameter drill bit.

The chips travel over the rake face intersecting edge, egress face and enter the flute face which is at a specific helix angle. The helix angle determines the length the chip must travel before reaching the top plane of the hole. The helix angle is different from the rake angle as illustrated. Accordingly, the egress face 40 transitions between the flute face 50 and the rake face 38. The helix angle (HA) varies between 10° to 40°. Preferably, the helix angle (HA) is 20° to 27° for a one quarter inch diameter drill bit.

The egress angle, in combination with the helix angle, acts as a chip breaker after the chips have traveled along the rake face 38. In addition, the egress angle dictates the path +the chips will take immediately after they are generated by the cutting edge 32 during the drilling action. The length of the rake face 38, egress angle, and helix angle combination guarantees the shortest smoothest and effortless transportation of chips from the drill tip to the shank region without affecting the mechanical strength of the drill bit in any appreciable way. This combination also dictates the cross-section area available for providing adequate support of the drill bit during the drilling process.

Figure 8:
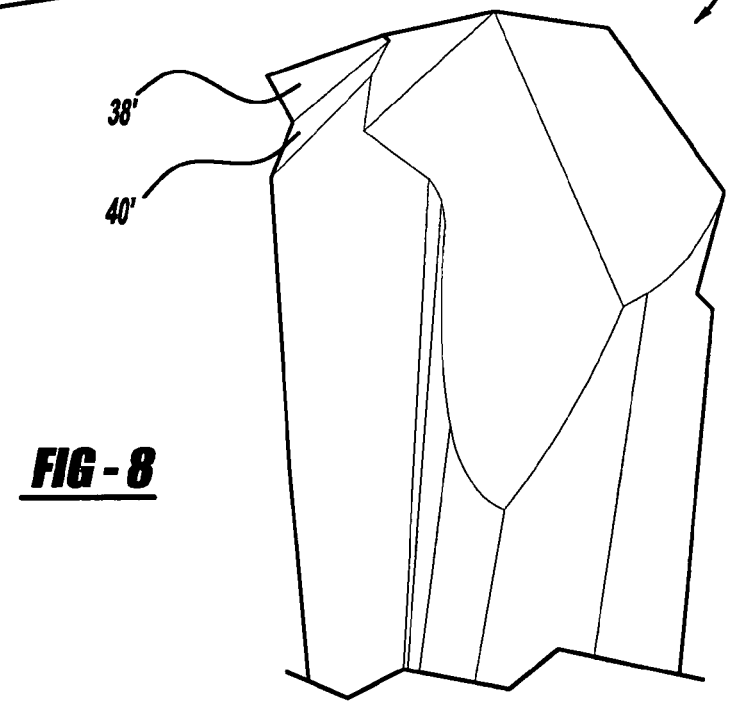
FIG. 8 is a perspective view of a drill bit tip in accordance with a second embodiment of the present invention.
Figure 9:
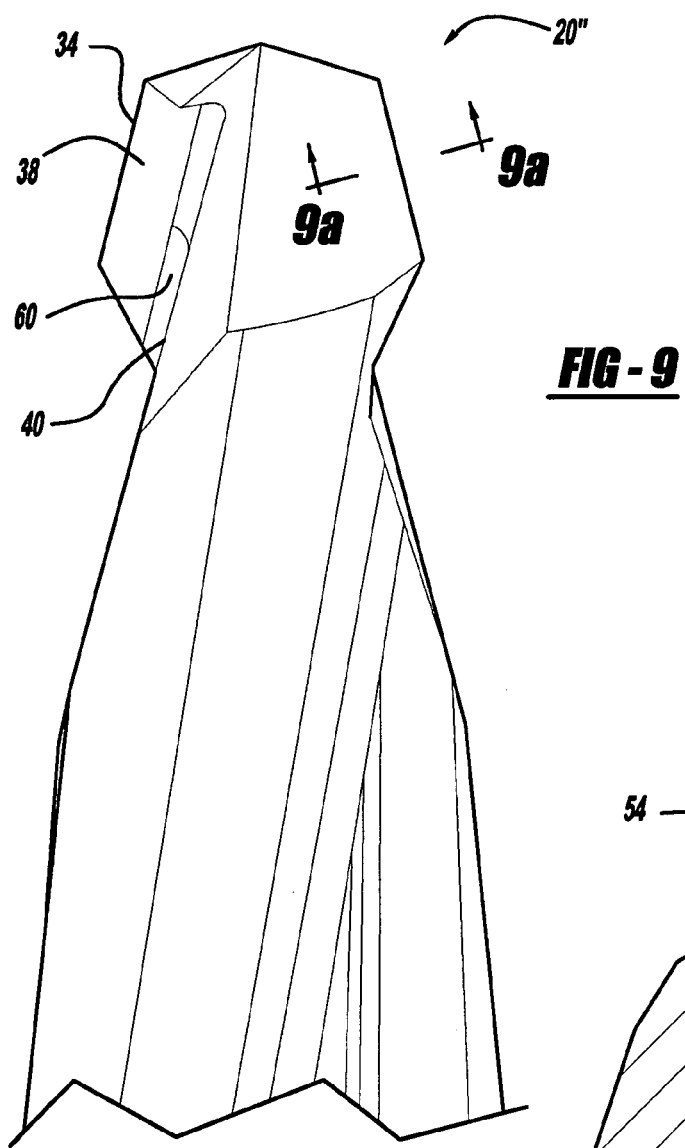
FIG. 9 is a perspective view of a drill bit tip in accordance with a third embodiment of the present invention.
Figure 9A:
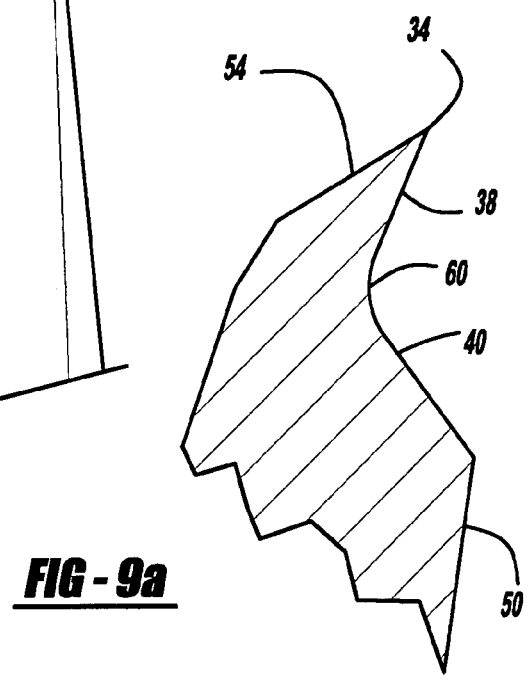
FIG. 9a is a cross-sectional view of FIG. 9 along line 9a—9a thereof.

FIGS. 8 through 9a illustrate alternate embodiments of the present invention. In FIG. 8, the rake face 38' and egress face 40' are shown having a triangular configuration. The triangular configuration works equally as well as the quadrilateral configuration illustrated in FIG. 3.

FIGS. 9 and 9a illustrate the intersecting edge being curved instead of sharp as illustrated in FIG. 3. The curved intersection 60 works equally as well as the sharp intersection for conveying chips from the rake surface to the egress surface.

While the above detailed description provides a preferred embodiment of the present invention, those skilled in the art will appreciate that the invention is subject to alteration, variation and deviation without departing from the scope and spirit of the present invention.

What is claimed is:

1. A drill bit comprising:
   a shank portion;
   a flute portion, said flute portion defining a helix angle; and
   a tip, said tip including a primary cutting edge extending to an outer periphery of the drill bit, said primary cutting edge defined by a rake face and a clearance face, said rake face defining a rake angle, said rake angle being different from said helix angle at said tip, an included angle is defined between said clearance face and said rake face, said included angle being between about 25° to about 45°; and
   an egress surface is between said rake surface and said flute at said tip such that said egress surface projects outward from said rake face so that chips cut from a workpiece contact said egress surface to provide a smooth transition into the flute portion.

2. A drill bit comprising:
   a shank;
   a flute; and
   a tip, said tip having at least one primary cutting edge, said cutting edge defined by a rake surface and a clearance face, an included angle is defined between said clearance face and said rake face, said included angle being between about 25° to about 45°; said rake surface extending from said cutting edge a desired length, an egress surface continuous with said rake surface, said egress surface extending outward from said rake surface and said egress surface continuous with a flute surface such that said flute surface and rake surface extend axially along the drill bit; and chips cut from a workpiece contact said egress surface to provide a smooth transition into the flute portion.

3. The drill bit according to claim 1 wherein said tip has a secondary cutting edge.

4. The drill bit according to claim 1 wherein said rake surface has a desired length dependent on the diameter of said drill bit between about 0.02 inch to about 0.1 inch.

5. The drill bit according to claim 1 wherein said egress face is on a desired angle to enhance chip removal.

6. The drill bit according to claim 1 wherein said drill bit has a pair of primary cutting edges.

7. The drill bit according to claim 6 wherein said pair of primary cutting edges define a primary point angle of between 90° and 150°.

8. The drill bit according to claim 6 wherein said drill bit has a pair of secondary cutting edges.

9. The drill bit according to claim 8 wherein said pair of secondary cutting edges define a secondary point angle of between 120° and 165°.

10. The drill bit according to claim 2 wherein said rake surface and said flute surface define different angles.

11. The drill bit according to claim 10 wherein said rake surface angle is between 15° and 45°.

12. The drill bit according to claim 10 wherein said flute surface angle is between 10° and 40°.

* * * * *